Aug. 30, 1960
E. JAULMES
2,950,625
TRANSMISSION USING A CHANGE SPEED GEAR
WITH A SINGLE EXPANDIBLE PULLEY
Filed March 11, 1958
4 Sheets-Sheet 4
Fig. 7
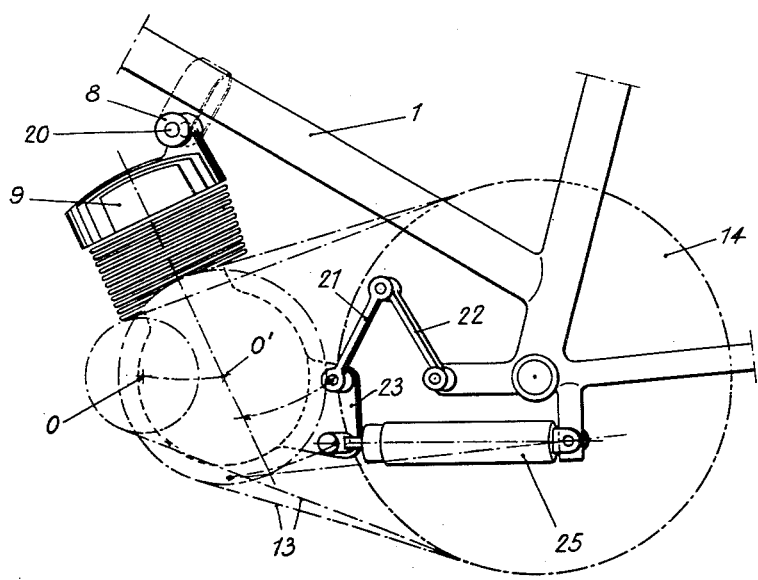
Fig. 8  Fig. 9
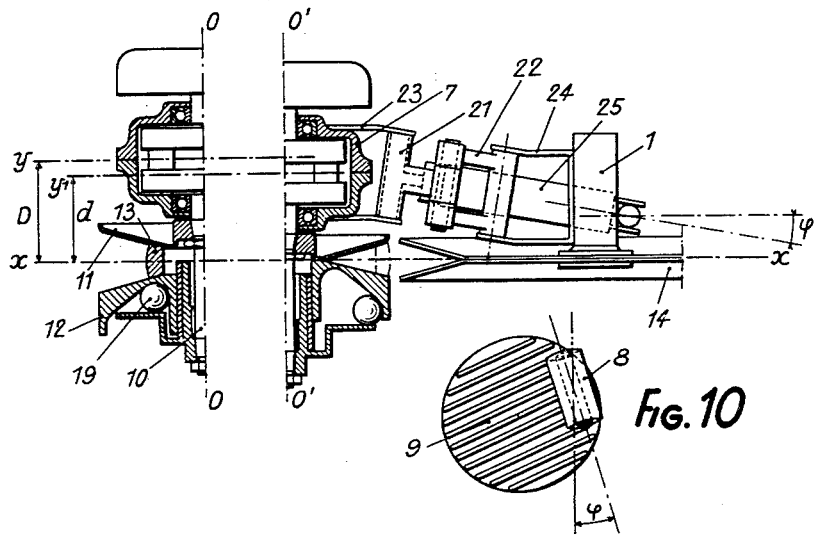
Fig. 10

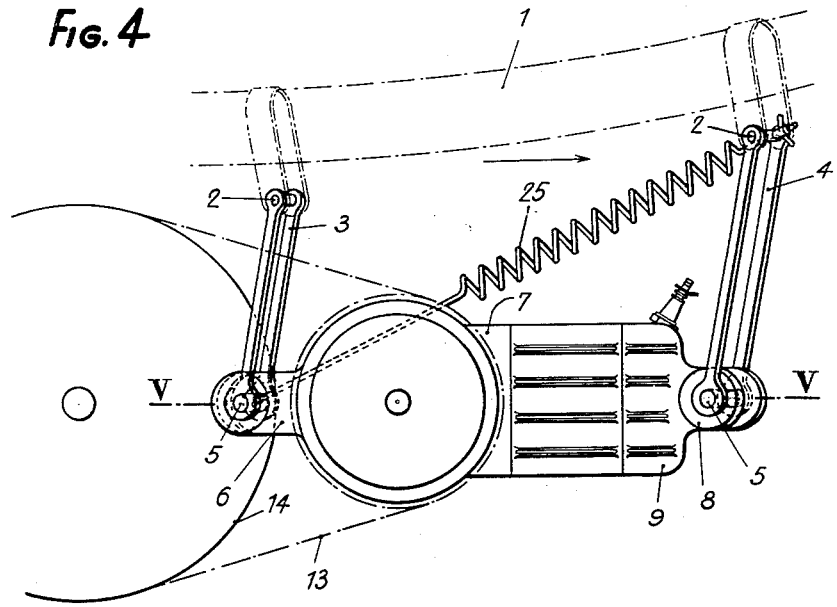
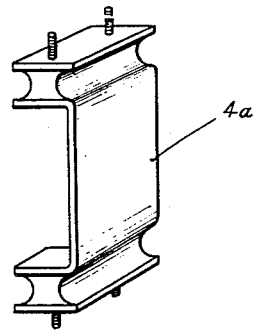
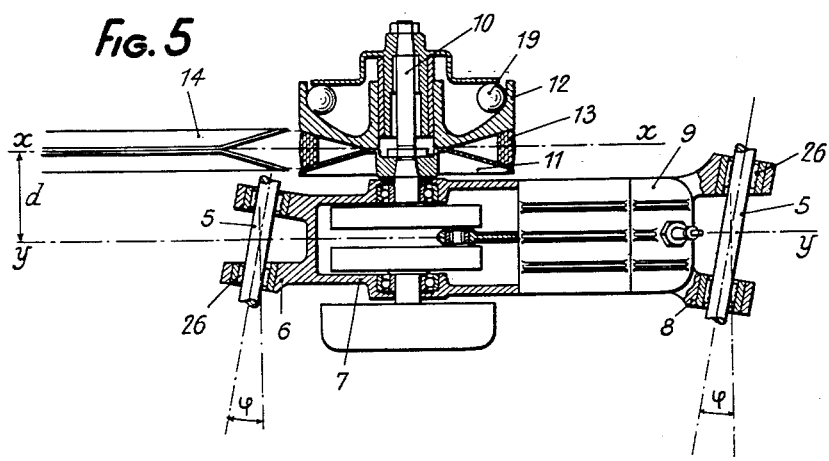

United States Patent Office 2,950,625
Patented Aug. 30, 1960

2,950,625

TRANSMISSION USING A CHANGE SPEED GEAR WITH A SINGLE EXPANDIBLE PULLEY

Eric Jaulmes, Paris, France, assignor to Ateliers de la Motobecane, Societe Anonyme Francaise, Pantin, France Filed Mar. 11, 1958, Ser. No. 720,699

Claims priority, application France Mar. 14, 1957

4 Claims. (Cl. 74—230.17)

This invention relates to a variable change speed transmission in which a belt of V- or trapezoidal cross section cooperates with a pulley, the effective diameter of which is varied by axial displacement of the movable flange of the pulley relative to a fixed flange thereof.

If, in a transmission including a trapezoidal belt, an expansible pulley, and another pulley, the effective diameter of the expansible pulley is varied by displacement of only one of its flanges, the other pulley (generally the driven pulley) being at the same time fixed and non-expansible, as is the case in certain well-known autocycles, a solution must be found to the problem of correctly aligning the belt which passes around these two pulleys.

One solution may be to simply dispense with this alignment. This very simple solution is effective for the transmission of low power, which only requires belts of slight width.

Another solution is to mount the driven, non-expansible pulley slidably on its shaft so that it automatically aligns itself with the expansible driving pulley, whatever may be the effective diameter of the latter. I have already developed such a solution for self-alignment.

The object of this invention is to provide a more effective solution of the problem of misalignment of the belt and pulleys in a transmission, including an expansible pulley of variable effective diameter.

Another object of this invention is to provide a variable change speed transmission of the V-belt and expansible pulley type in which a motor with an expansible pulley on its drive shaft is mounted to oscillate or swing towards and away from a driven pulley and in its swinging or oscillating movement is displaced axially of its drive shaft to shift the fixed flange of the expansible pulley and reduce the extent of shift of the displaceable flange relative to the center line of the belt to maintain the expansible pulley in alignment with the belt.

The present invention is achieved by a novel arrangement comprising no parts other than those normally present in such transmissions.

It consists essentially in the fact that the one or more axes of rotation or articulation of a vehicle motor are not perpendicular to the plane of the transmission belt of the vehicle, and consequently lie obliquely to the center line of the crankshaft.

This obliqueness is such that at each position taken by the motor, the fixed truncated cone flange of the expansible pulley will occupy a position which is symmetrical with that of the movable flange of this pulley relative to the median plane of the fixed, driven pulley. All this takes place, in practice, as if the two flanges of the expansible pulley were axially movable, and the V- or trapezoidal belt therefore remains always in alignment with the fixed pulley.

The invention will best be explained with reference to the accompanying drawings, which represent diagrammatically two different forms of construction, given by way of simple illustrative examples.

In these drawings:

Figure 4 is similar to Figure 2 and shows the mechanism in the position of high speed;

Figure 5 shows a horizontal section along the line V—V of Figure 4;

Figure 6 shows an elastic hanger for the motor, in perspective;

Figure 7 is a diagrammatic view of the side elevation of another embodiment of the invention;

Figure 8 shows a horizontal section of the motor of Figure 7 in the position of extreme oscillation to the front;

Figure 9 is a corresponding view of the mechanism, in the position of extreme oscillation of the motor to the rear;

Figure 10 is a detailed plain view;

Figure 11 is a view showing prestressed metal-rubber rings by which the pivoted links of the mechanism may be connected to the vehicle frame; and Figure 12 is a view showing a flexible leaf spring hanger by which the mechanism may be connected to the vehicle frame.

Figure 1:
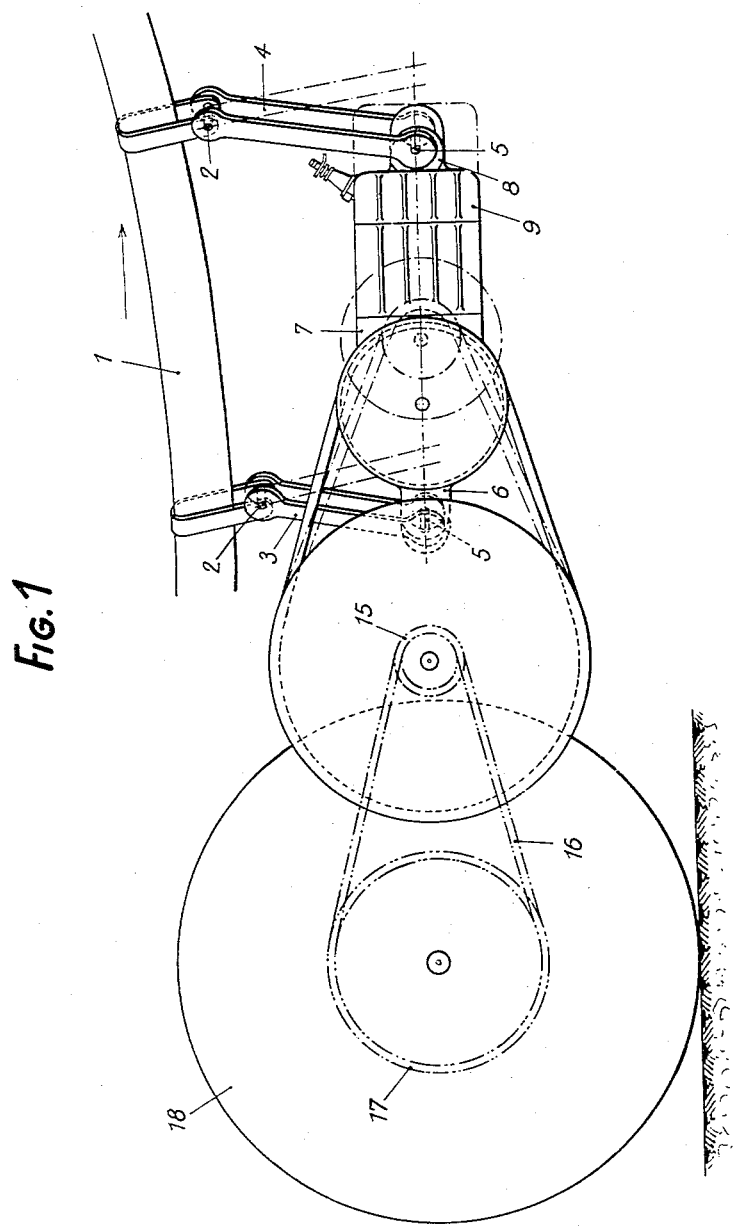
Figure 1 is a diagrammatic view showing, in side elevation, the lower part of an autocycle constructed in accordance with a preferred embodiment of the invention.

The frame of the autocycle shown in Figure 1 has two horizontal pivot pins 2 for the suspension links 3, 4, the other ends of which are articulated on the short shafts or pins 5, one of which is rotatably positioned in a lug 6 carried by the casing 7 of the motor, and the other of which is rotatably positioned in a lug 8 carried by the head of this motor, which has its cylinder disposed horizontally.

Figure 3:
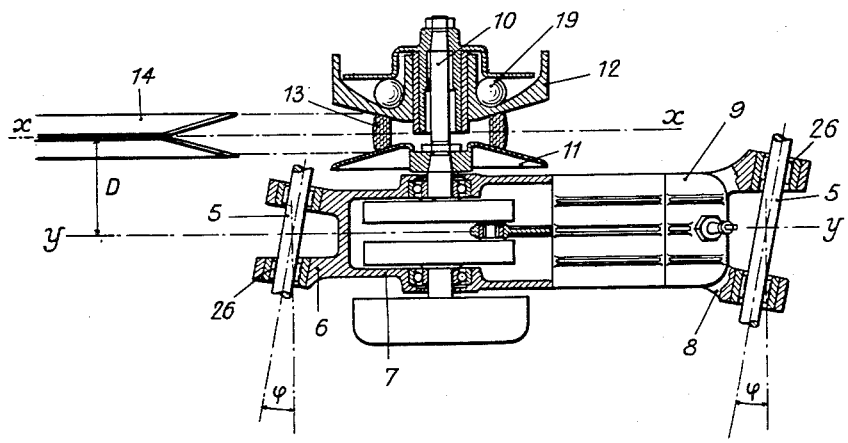
Figure 3 is a corresponding view in horizontal section, along the line III—III of Figure 2.

As shown in Figures 3 and 5, the output shaft 10 of the motor carries an expansible pulley of known construction comprising a fixed truncated cone or flange 11 and a truncated cone or flange 12 which is axially shiftable to vary the spacing between the fixed and shiftable flanges and the radial depth of entry of the belt into the space between the flanges and thereby vary the effective diameter of the pulley.

The trapezoidal belt 13 engages the cones or flanges 11, 12 and drives input pulley 14 of a reduction gear comprising, in some cases, a clutch and which has an output sprocket 15 which is connected by a chain 16 to the toothed sprocket wheel 17 rigidly connected with the rear wheel 18.

The expansible pulley is provided with centrifugal balls 19 which upon rotation of the pulley tend to shift the flange 12 nearer to the flange 11, and thereby to increase the effective diameter of the pulley. This action is opposed to that of a resisting couple, the effect of which is to urge the trapezoidal belt toward the axis of the pulley between the flanges 11, 12, thereby reducing the effective diameter. To this effect tending to reduce the effective diameter is added that of a compensatory spring 25 which is adjustable by means of the wing nut shown, ensuring permanent tension on the belt and constantly tending to urge the motor to its extreme forward position indicated in Figure 2, this position being that of the lowest speed ratio. In the example shown in Figure 2, the member 25 is a tension spring, but it could equally well be a compression spring, as shown in Figure 7.

Figure 2:
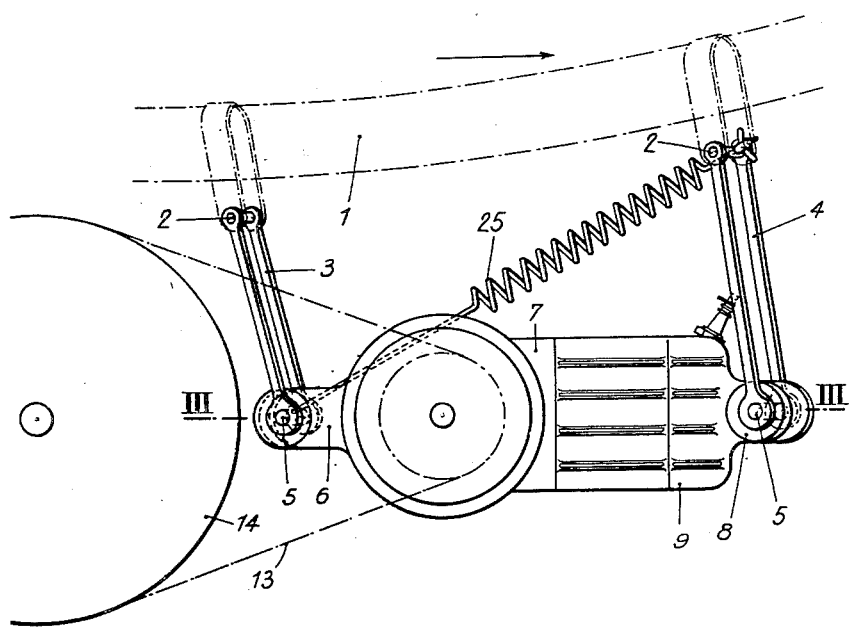
Figure 2 shows the motor and the change speed gear of this transmission, in the position of low speed.

At the start, the position of the constituent parts of the mechanism is that shown in Figures 2 and 3 where the effective diameter of the pulley 11, 12 is at its minimum, the flanges 11, 12 being at their greatest possible distance apart and the spring 25 being relaxed or stressed at its minimum.

The resisting couple being low, the motor accelerates completely, and, under the influence of the centrifugal action on balls 19 and against that of the resisting couple, to which is added the action of the spring 25, the mechanism finally takes up the extreme opposite position, shown in Figures 4 and 5, where the effective diameter of the pulley 11, 12 is greatest because the flanges 11, 12 are closest together.

According to the essential characteristic of the invention, the pivot pins 2, 5 are not perpendicular to the plane of the belt 13, i.e. parallel to the center line of the crankshaft of the motor, but oblique, the extent of this obliqueness being expressed by the angle $\varphi$ (see Figures 3 and 5). The effect of this obliqueness is to tend to bring about a lateral displacement of the motor—and consequently also of the fixed flange 11 of its pulley—when it moves between its two extreme positions, indicated in Figures 2 and 4 respectively. When the motor takes up the position shown in Figures 2 and 3 (lowest speed ratio), the distance between the fixed plane $x$—$x$ of the pulley 14 of the reduction gear and the movable plane $y$—$y$ of the motor is greatest, and equal to D. When, on the other hand, the motor takes up the position shown in Figures 4 and 5 (highest speed ratio), this distance is reduced to $d$.

By construction, the difference $D$—$d$ is chosen to be equal to half the maximum travel of the movable flange 12 relative to the fixed flange 11.

Thus, at each instant, and at each intermediate position of the motor, the flanges 11, 12 will both be displaced by a practically equal amount on either side of the plane $x$—$x$, thereby always ensuring under these conditions the perfect alignment of the belt 13 even though the flange 11 is axially fixed with respect to the motor and the flange 12 is axially movable with respect to the motor.

In other words, each alteration of the effective diameter of the pulley 11, 12 will be the result of a symmetrical displacement of the two flanges of the expansible pulley relative to the median plane $x$—$x$ of belt 13 and pulley 14, which is the ideal condition for good functioning of a transmission with automatic change speed of the type in question. This technical advance is directly related to the obliqueness of the axes of the pivot pins or shafts 2, 5 provided according to the invention, and is brought about without any mechanical complication of the device improved in this way.

Figures 7 to 10 relate to another form of construction, particularly applicable to an autocycle with a hanging motor, of the well-known type "Mobylette." Here too, the essential difference from the existing mechanism lies in the obliqueness $\varphi$ given to the axis of the pivot 20 of the motor on the frame 1.

The frame 1 of the autocycle supports, by a strap and pivot pin 20, a lug 8 of the motor 9. The other end of the motor 9 is supported by the links 21 and 22, the latter being pivotally connected, as shown in Figure 9, to an off-set U-bracket 24 that is secured to the frame 1. The link 21 is pivotally connected to a flange 23 of the motor 9, and there is also pivotally connected to flange 23 one end of a compensatory spring 25, the other end of which is pivoted on the frame 9.

As to the expansible pulley 11, 12, its construction is identical to that of the pulley shown in Figures 3 and 5.

The mode of functioning of this second embodiment is as follows:

At the start, and under the action of the compression spring 25, the motor is in its extreme forward position, in which the center line of its crankshaft is situated at 0 (see Figures 7 and 8). The effective diameter of the pulley 11, 12 is thus at a minimum, and the distance which separates the fixed plane $x$—$x$ of pulley 14 from the movable plane $y$—$y$ of symmetry of the motor is again equal to D.

At the extreme rear position of the motor, corresponding to the maximum speed ratio, on the other hand, the center line of the crankshaft has come to 0', the effective diameter of the pulley 12, 13 is maximum and, due to the obliqueness of the pivot pin 20, the plane of symmetry $y$—$y$ of the motor has moved to $y'$—$y'$, the distance separating the planes $x$—$x$ and $y'$—$y'$ now being $d$.

Here again, the difference $D$—$d$ is equal to half the travel of the movable flange 12 of the expansible pulley relative to the fixed flange 11, as in the first embodiment; the correct alignment of the belt 13 with pulley 14 and plane $x$—$x$ is thus automatically ensured in all intermediate positions of the oscillating system.

In this embodiment, the center line or axis of the crankshaft does not remain strictly parallel with itself in the course of its displacement in its arc of movement about the axis of the pivot pin 20. Nevertheless, and provided that this arc has a sufficient radius, this deviation from the parallel direction is compatible with satisfactory practical functioning.

It has been assumed above that the motor moved about the pivot pins or spindles 2, 5 or 20 mounted in journal bearings or on needle bearings, such as 26 for example.

It is furthermore possible, according to the invention, to use, for articulation of the pivots, a mounting on known metal-rubber rings. By imposing a pre-stressing in the suitable direction on these rings, they could replace, entirely or partly, the compensating device 25 or improve it or further modify its characteristics.

It is also possible to replace the fixed links 3, 4 by flexible hangers consisting, for example, of leaf springs rigidly anchored to the frame 1 while maintaining the angle of obliqueness $\phi$, and articulated to the motor by their other free ends, or conversely.

As has been shown by illustrative example in Figure 6, these hangers 4a may also be formed by a metal-rubber combination and may have a non-uniform section in elevation which is suitable to confer on them calculated characteristics of flexibility in order mainly to cancel almost completely the restoring couple of these hangers, and consequently not to affect the law of response provided for the compensatory spring 25. In Figure 6, the mid-part of the hanger 4a illustrated is rubber and it bonded to the metal end parts.

All these variations are within the scope of the invention, as defined by the claims appended hereto.

Having described my invention, I claim:

1. In a motorcycle having a frame, a rear driving wheel, a motor having an output shaft, means pendularly suspending the motor from the frame to pivotally swing about transverse horizontal pivot means, an expansible driving pulley mounted on said output shaft and having one fixed flange and one axially movable flange, a rotary horizontal intermediate shaft fixedly mounted on the frame and having a driving connection with the rear wheel, a driven pulley on said intermediate shaft, and a belt of trapezoidal cross section cooperating with and drivingly connecting said pulleys, the improvement comprising positioning the axis of the pivot means about which the means suspending the motor swings obliquely relative to the frame to positively impose on the entire motor during its pendular swinging a transverse displacement equal to one half of the displacement of the movable flange of the expansible pulley in a direction opposite to the direction of displacement of said movable flange.

2. In a motorcycle according to claim 1 in which the motor is position with its cylinder inclined to the vertical and is suspended from the frame by a single pivot connected to the head of said cylinder.

3. In a motorcycle according to claim 1, in which the motor is mounted with its cylinder horizontal and is suspended by rigid links connected between the frame and motor about transverse horizontal oblique pivots.

4. In a motorcycle according to claim 1, in which the suspending means are flexible and elastic.

References Cited in the file of this patent

UNITED STATES PATENTS

| | | |
|---|---|---|
| 1,420,680 | Bell et al. | June 27, 1922 |
| 1,452,693 | Lord | Apr. 24, 1923 |
| 1,458,318 | Bell | June 12, 1923 |
| 2,189,288 | Heyer | Feb. 6, 1940 |
| 2,258,970 | Buettell | Oct. 14, 1941 |
| 2,491,076 | Benazzoli | Dec. 23, 1949 |
| 2,574,824 | Garelli | Nov. 13, 1951 |
| 2,794,510 | Mennesson | June 4, 1957 |

FOREIGN PATENTS

| | | |
|---|---|---|
| 1,115,792 | France | Jan. 16, 1956 |